United States Patent
Moorhouse (10) Patent No.: US 10,574,739 B2
(45) Date of Patent: Feb. 25, 2020

(54) SYSTEM AND METHOD FOR SMART EVENT PAGING

(71) Applicant: Honeywell International Inc., Morris Plains, NJ (US)

(72) Inventor: James Edward Moorhouse, Milford, OH (US)

(73) Assignee: Honeywell International Inc., Morris Plains, NJ (US)

( * ) Notice: Subject to any disclaimer, the term of this patent is extended or adjusted under 35 U.S.C. 154(b) by 365 days.

(21) Appl. No.: 15/055,170

(22) Filed: Feb. 26, 2016

(65) Prior Publication Data
US 2017/0251053 A1 Aug. 31, 2017

(51) Int. Cl.
*G06F 15/16* (2006.01)
*H04L 29/08* (2006.01)
*H04W 4/70* (2018.01)
*G05B 19/418* (2006.01)

(52) U.S. Cl.
CPC .... *H04L 67/1002* (2013.01); *G05B 19/41855* (2013.01); *H04L 67/22* (2013.01); *H04L 67/2842* (2013.01); *H04W 4/70* (2018.02); *G05B 2219/1128* (2013.01); *H04L 67/12* (2013.01)

(58) Field of Classification Search
CPC .................................................. H04L 67/1002
See application file for complete search history.

(56) References Cited

U.S. PATENT DOCUMENTS

| 6,535,122 B1 | 3/2003 | Bristol |
| 6,941,557 B1 | 9/2005 | Jakobson et al. |
| 7,539,724 B1 | 5/2009 | Callaghan |

(Continued)

FOREIGN PATENT DOCUMENTS

| JP | 2013038601 A | 2/2013 |
| KR | 1020030021537 A | 3/2003 |

(Continued)

OTHER PUBLICATIONS

Notification of Transmittal of the International Search Report and the Written Opinion of the International Searching Authority, or the Declaration dated Jul. 28, 2016 in connection with International Patent Application No. PCT/US2016/029953.

(Continued)

*Primary Examiner* — Kevin T Bates
*Assistant Examiner* — Clarence D McCray (57) ABSTRACT

A method includes receiving a first event request message from a client device. The method also includes retrieving one or more first events that have most recently occurred since a previous event request and that have not already been provided to the client device, up to a first event paging size and a first event history age limit. The method further includes determining that one or more second events are within the first event history age limit and have not already been provided to the client device but are in excess of the first event paging size. The method also includes populating a page-state string to indicate the one or more second events. The method further includes generating a first response message including the one or more first events and the page-state string. In addition, the method includes sending the first response message to the client device.

17 Claims, 5 Drawing Sheets

(56) References Cited

U.S. PATENT DOCUMENTS

| | | | |
|---|---|---|---|
| 2007/0297557 | A1 | 12/2007 | Kuwatani |
| 2008/0154399 | A1* | 6/2008 | Kaneko .............. G05B 19/4184 700/90 |
| 2008/0243632 | A1* | 10/2008 | Kane ................ G06F 17/30867 705/14.66 |
| 2009/0259751 | A1 | 10/2009 | Thibault et al. |
| 2010/0082133 | A1 | 4/2010 | Chouinard et al. |
| 2011/0213488 | A1* | 9/2011 | Suzuki .............. G05B 23/0272 700/109 |
| 2011/0276165 | A1* | 11/2011 | Ko .................... G05B 23/0245 700/104 |
| 2012/0029678 | A1 | 2/2012 | McGreevy et al. |
| 2012/0079282 | A1 | 3/2012 | Lowenstein et al. |
| 2013/0002697 | A1* | 1/2013 | Ashley ................ G06T 11/206 345/589 |
| 2013/0212186 | A1 | 8/2013 | Camp et al. |
| 2014/0047107 | A1 | 2/2014 | Maturana et al. |
| 2014/0121789 | A1* | 5/2014 | Brandes .............. G05B 23/027 700/80 |
| 2014/0344369 | A1 | 11/2014 | Goldberg et al. |
| 2015/0007265 | A1 | 1/2015 | Aissi et al. |
| 2015/0077263 | A1 | 3/2015 | Ali et al. |
| 2015/0254115 | A1* | 9/2015 | Kuroda .................. G06F 9/542 719/318 |
| 2016/0328954 | A1* | 11/2016 | Ramadoss .......... G05B 19/0428 |
| 2016/0334765 | A1 | 11/2016 | Duca et al. |
| 2016/0334770 | A1 | 11/2016 | Laycock et al. |
| 2016/0335373 | A1 | 11/2016 | Burd et al. |
| 2016/0335858 | A1 | 11/2016 | Burd et al. |
| 2016/0337166 | A1 | 11/2016 | Duca et al. |
| 2016/0337289 | A1 | 11/2016 | Duca et al. |
| 2016/0337404 | A1* | 11/2016 | Duca ...................... H04L 51/38 |

FOREIGN PATENT DOCUMENTS

| | | |
|---|---|---|
| KR | 100599852 B1 | 7/2006 |
| KR | 101077591 B1 | 10/2011 |
| KR | 1020120087235 A | 8/2012 |
| KR | 1020130006760 A | 1/2013 |
| KR | 1020140059788 A | 5/2014 |
| KR | 1020140103859 A | 8/2014 |
| WO | 2013144706 A2 | 10/2013 |

OTHER PUBLICATIONS

Notification of Transmittal of the International Search Report and the Written Opinion of the International Searching Authority, or the Declaration dated Aug. 9, 2016 in connection with International Patent Application No. PCT/US2016/029758.

Notification of Transmittal of the International Search Report and the Written Opinion of the International Searching Authority, or the Declaration dated Jul. 28, 2016 in connection with International Patent Application No. PCT/US2016/030012.

Notification of Transmittal of the International Search Report and the Written Opinion of the International Searching Authority, or the Declaration dated Jul. 28, 2016 in connection with International Patent Application No. PCT/US2016/030037.

Notification of Transmittal of the International Search Report and the Written Opinion of the International Searching Authority, or the Declaration dated Aug. 9, 2016 in connection with International Patent Application No. PCT/US2016/030377.

Notification of Transmittal of the International Search Report and the Written Opinion of the International Searching Authority, or the Declaration dated Jul. 28, 2016 in connection with International Patent Application No. PCT/US2016/029984.

Product Overview, WIN-911 Software, Jan. 13, 2015, 2 pgs.

Product Overview, WIN-911 Enterprise Edition, Feb. 27, 2014, 2 pgs.

Product Data Sheet, WIN-911 Software, Mobile Edition, Smartphone Data Sheet, Sep. 25, 2015, 2 pgs.

Specter Instruments, Technical Brief, WEB-911 XTools, Jan. 26, 2009, 1 pg.

Specter Instruments, WIN-911/Lite, Jan. 2005, 2 pgs.

Product Overview, WIN-911 Version 7, Feb. 11, 2014, 2 pgs.

User's Manual, "WIN-911 V7.12", Oct. 11, 2011, 582 pgs.

Technical Brief, "WIN-911 Version 7.17.00, Changes and Enhancements: General WIN-911: V6.18 to V7.17.00", Sep. 10, 2015, 15 pgs.

Foreign Comunication From a Related Counterpart Application, PCT Application No. PCT/US2017/015717, Transmittal of the International Search Report and Written Opinion dated May 11, 2017, 11 pages.

* cited by examiner

SYSTEM AND METHOD FOR SMART EVENT PAGING

TECHNICAL FIELD

This disclosure relates generally to industrial process control and automation systems. More specifically, this disclosure relates to a system and method for smart event paging in industrial process control and automation systems.

BACKGROUND

Industrial process control and automation systems are often used to automate large and complex industrial processes. These types of systems routinely include sensors, actuators, and controllers. The controllers are often arranged hierarchically in a control and automation system. For example, lower-level controllers are often used to receive measurements from the sensors and perform process control operations to generate control signals for the actuators. Higher-level controllers are often used to perform higher-level functions, such as planning, scheduling, and optimization operations. Human operators routinely interact with controllers and other devices in a control and automation system, such as to review warnings, alarms, or other notifications associated with various events and make adjustments to control or other operations.

SUMMARY

This disclosure provides a system and method for smart event paging in industrial process control and automation systems.

In a first embodiment, a method includes receiving a first event request message from a client device. The method also includes retrieving one or more first events that have most recently occurred since a previous event request and that have not already been provided to the client device, up to a first event paging size and a first event history age limit. The method further includes determining that one or more second events are within the first event history age limit and have not already been provided to the client device but are in excess of the first event paging size. The method also includes populating a page-state string to indicate the one or more second events. The method further includes generating a first response message including the one or more first events and the page-state string. In addition, the method includes sending the first response message to the client device.

In a second embodiment, an apparatus includes at least one processing device and at least one interface configured to communicate with a client device. The at least one processing device is configured to receive a first event request message from the client device. The at least one processing device is also configured to retrieve one or more first events that have most recently occurred since a previous event request and that have not already been provided to the client device, up to a first event paging size and a first event history age limit. The at least one processing device is further configured to determine that one or more second events are within the first event history age limit and have not already been provided to the client device but are in excess of the first event paging size. The at least one processing device is also configured to populate a page-state string to indicate the one or more second events. The at least one processing device is further configured to generate a first response message including the one or more first events and the page-state string. In addition, the at least one processing device is configured to send the first response message to the client device.

In a third embodiment, a non-transitory computer readable medium contains instructions that, when executed by at least one processing device, cause the at least one processing device to receive a first event request message from a client device. The medium also contains instructions that, when executed by the at least one processing device, cause the at least one processing device to retrieve one or more first events that have most recently occurred since a previous event request and that have not already been provided to the client device, up to a first event paging size and a first event history age limit. The medium further contains instructions that, when executed by the at least one processing device, cause the at least one processing device to determine that one or more second events are within the first event history age limit and have not already been provided to the client device but are in excess of the first event paging size. The medium also contains instructions that, when executed by the at least one processing device, cause the at least one processing device to populate a page-state string to indicate the one or more second events. The medium further contains instructions that, when executed by the at least one processing device, cause the at least one processing device to generate a first response message including the one or more first events and the page-state string. In addition, the medium contains instructions that, when executed by the at least one processing device, cause the at least one processing device to send the first response message to the client device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In industrial process control and automation systems, it is common practice for an operator to request and receive an arbitrarily long list of events on a mobile device, where new events are displayed at the top of the list as they occur. This practice can be complicated by a number of factors. For example, the list may be too long for a single server request and thus may require event "paging," in which pages of events are loaded in sequence. This allows the operator to view some events before all events have been uploaded. Also, mobile or remote devices may have intermittent communication outages, thereby causing interruptions in event paging. Further, certain events may be higher priority or critical, such as when the events involve production process failures, thereby making the order of event uploading critical. That is, newer events should be uploaded before older events. In addition, some systems require scalability such that the system cannot depend on a single event server to keep track of the state of each request for events.

These factors result in certain characteristics for an event notification system. For example, the first factor above may require that a system transmit events in smaller increments. The second factor above can create situations where large numbers of new events disrupt the flow and generate new time segments for event paging, which can lead to multiple time segments that have been partially uploaded to the requesting device and making event tracking difficult. The third factor above may require that a system page backward in time, and the fourth factor may require that each event server in the system remains stateless with respect to event requests.

To address these and other issues, this disclosure provides a smart event paging system and method that utilize a robust algorithm for tracking the state of event paging. As described in more detail below, the algorithm uses a "page-state" string that is passed between an event source (such as an event server) and a destination (such as a requesting client device) and allows for complete scalability. The page-state string allows the server to know the current state of the request and respond accordingly when preparing new event pages, and the server is not required to track this state otherwise. The state is returned to the client device with each page and sent back to the server with each new event request. The page-state string allows the system to accurately return prioritized events over any amount of time and with any amount of communication disruption.

Figure 1:
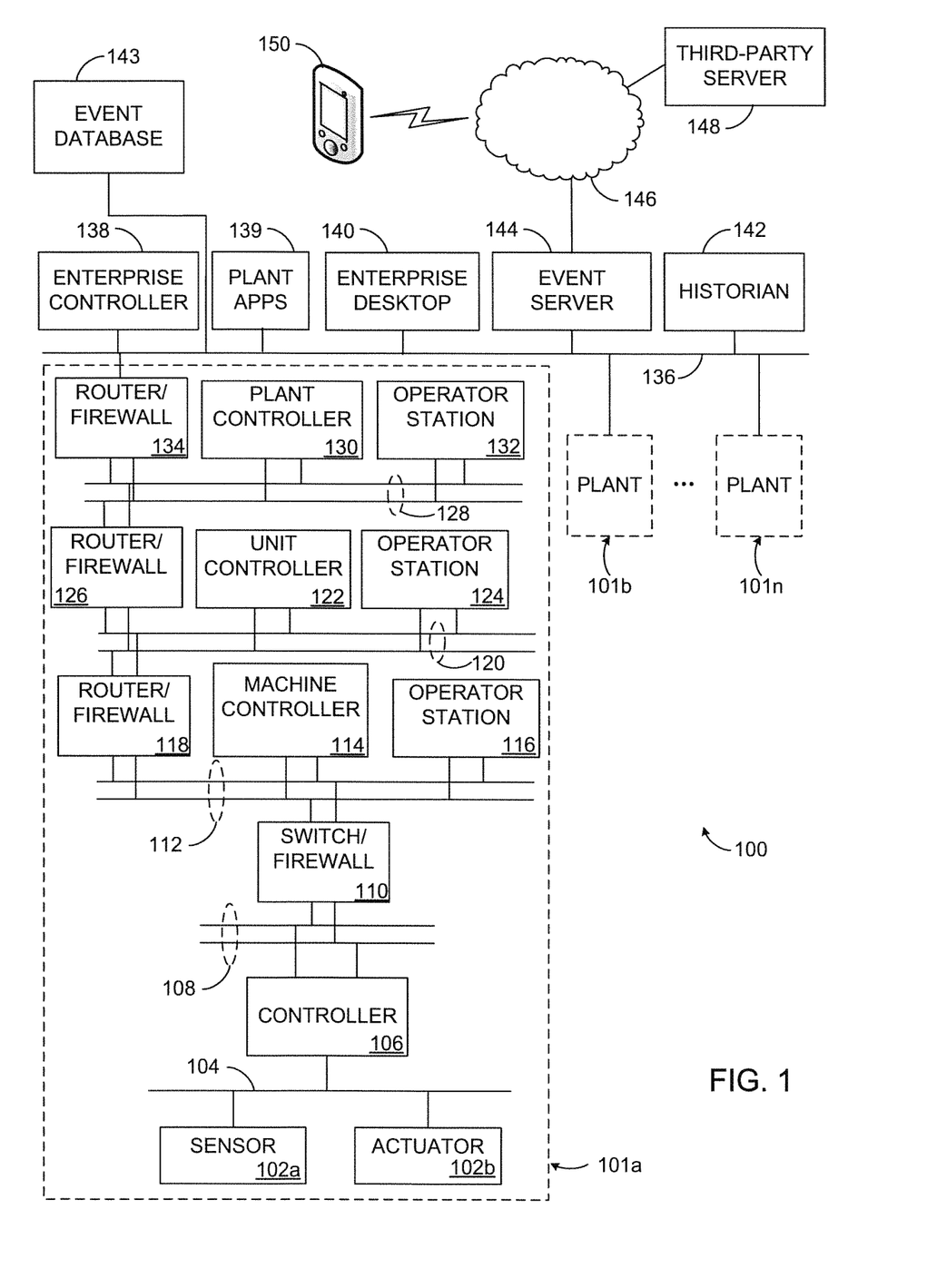
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Additionally or alternatively, each controller 114 could represent a multivariable controller embedded in a Distributed Control System (DCS), such as a RMPCT controller or other type of controller implementing MPC or other APC. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Various plant applications 139 could also be executed in the system 100. In this example, the plant applications 139 are shown as residing on Level 5 of the system 100, although plant applications 139 could reside on other or additional levels of the system 100. The plant applications 139 could represent any suitable applications that are executed by server computers or other computing devices.

Access to the enterprise-level controllers 138 and plant applications 139 may be provided by one or more enterprise desktops (also referred to as operator stations) 140. Each of the enterprise desktops 140 includes any suitable structure for supporting user access and control of one or more components in the system 100. Each of the enterprise desktops 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 142 can be coupled to the network 136. The historian 142 could represent a component that stores various information about the system 100. The historian 142 could, for instance, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 and each of the operator stations 116, 124, 132, 140 could include one or more processing devices and one or more memories for storing instructions and data used, generated, or collected by the processing device(s). Each of the controllers 106, 114, 122, 130, 138 and each of the operator stations 116, 124, 132, 140 could also include at least one network interface, such as one or more Ethernet interfaces or wireless transceivers, facilitating communication over one or more networks or communication paths.

Engineers and other personnel in industrial facilities often need to troubleshoot problems and investigate improvement opportunities. In the course of these or other activities, the personnel routinely find and review significant amounts of information regarding events that occur within the industrial facilities. As events with the industrial facilities occur, records of the events may be stored in an event database 143. Each event record stored in the event database 143 could include a reference to one or more associated events, a time that the event occurred, and other related information. The event database 143 includes any suitable structure for storing and facilitating retrieval of events. In some embodiments, the event database 143 may represent a single common database for multiple (possibly all) data items in the system 100, providing a centralized storage for the events. In other embodiments, the event database 143 may represent multiple databases or other data stores that are distributed or decentralized across the system 100.

One example use of the event database 143 is in conjunction with notifications provided to users' mobile devices, where users can use the mobile devices to review and respond to events or other data items. The widespread use of mobile "smart" devices (such as APPLE IPHONEs and IPADs and ANDROID devices) allows users to remain connected and to interact with remote computing devices from virtually anywhere each user travels. Among other things, this could allow personnel associated with an industrial process control and automation system to receive warnings, alerts, or other notifications associated with events and other information and trigger actions associated with the control and automation system, regardless of whether the personnel are physically located at an industrial site. For example, events that are generated in a process control and automation system are often presented to operators currently on shift in one or more control rooms. There may also typically be a need or desire to inform users outside of control rooms, outside of an industrial plant, or while off network of events that are happening in the control and automation system. These events can come from a variety of applications, such as from a distributed control system (DCS) itself, advanced process control applications, operations applications, or business applications. Delivery of notifications describing these events to a user's handheld mobile device enables the user to receive notifications virtually anywhere and at any time.

To support this functionality, the system 100 includes an event server 144, which receives event information stored in the event database 143 (and associated with other component(s) of the system 100) or from other source(s) and generates event notifications for users. For example, the event server 144 could receive information identifying different events that occur with the system 100. The events could be associated with any suitable activities or conditions in the system 100, such as the generation of warnings or alerts by other components in the system 100. The event server 144 uses this information to generate event notifications and other messages to be sent to appropriate users. The event server 144 could also provide additional information to appropriate users in response to user interactions with those notifications or other messages.

The event server 144 communicates over a third-party network 146 with a third-party server 148. The third-party network 146 generally represents any suitable communication network(s) outside the system 100 (and therefore out of the control of the owners/operators of the system 100). The third-party network 146 could, for example, represent the Internet, a cellular communication network, or other network or combination of networks. The third-party server 148 represents a server used to provide notifications to end-user devices 150. For example, the third-party server 148 could push notifications to the end-user devices 150, allow retrieval of notifications by the end-user devices 150 at specified intervals or when requested, or provide notifications in any other suitable manner. The end-user devices 150 can then connect to the event server 144 over the network 146 to receive details about notifications and events or to query for any notifications. As a particular example, the third-party server 148 could be used by companies like APPLE, SAMSUNG, or GOOGLE to provide push notifications or other notifications to mobile devices.

The end-user devices 150 denote any suitable user devices that can receive and present notifications to users. Examples of end-user devices 150 include smartphones, tablet computers, or other communication/computing devices. Specific examples could include APPLE IPHONEs, APPLE IPADs, and ANDROID devices.

In one aspect of operation, the event server 144 and one or more end-user devices 150 communicate event-related information using event paging. In event paging, each end-user device 150 requests a listing of events, and the event server 144 returns information of relevant events to the end-user devices 150 in pages. The event data can be generated by various sources (such as any of the components shown in FIG. 1) at any frequency, including a slow period followed by a burst period followed by another slow period.

The event server 144 detects new events and generates each new page with the latest events and events within unprocessed or partially-processed time segments. Each of the end-user devices 150 makes an initial call to start the event paging process, followed by additional calls to collect new pages until all events are uploaded. The end-user devices 150 may then continue making calls with suitable time delays to seek newly-generated events.

As described in more detail below, an event notification algorithm at the event server 144 is configured to page through historical lists of events while returning new events to the end-user devices 150 as they appear. The algorithm may have to contend with interruptions caused by unreliable connectivity while giving priority to the newest events. Due to these factors, the algorithm is configured to track a number of partially processed time segments as described in greater detail below.

Although FIG. 1 illustrates one example of an industrial process control and automation system 100, various changes may be made to FIG. 1. For example, a control system could include any number of sensors, actuators, controllers, operator stations, networks, databases, servers, end-user devices, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, while FIG. 1 illustrates one example environment in which smart event paging can be executed, this functionality can be used in any other suitable device or system.

Figure 2:
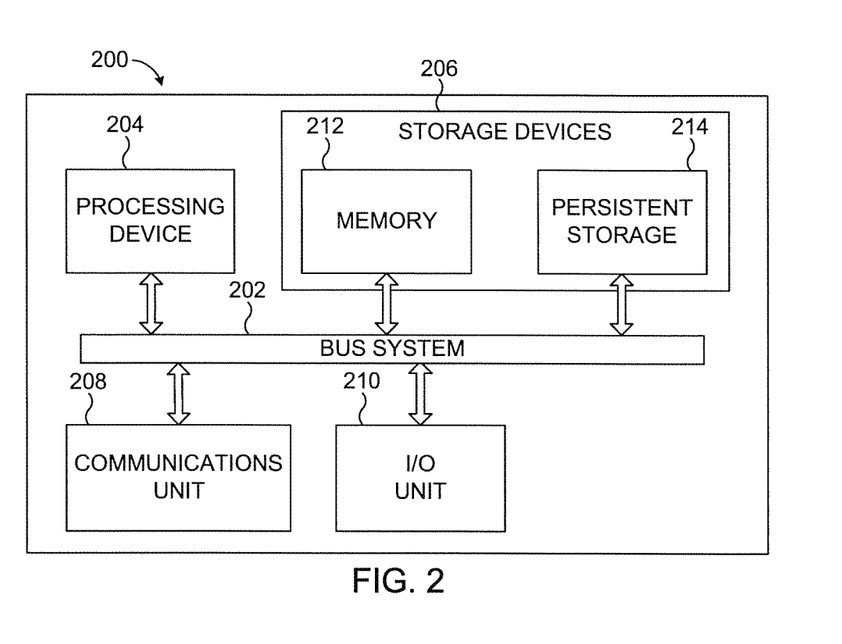
FIG. 2 illustrates an example device supporting smart event paging in an industrial process control and automation system according to this disclosure.

FIG. 2 illustrates an example device 200 supporting smart event paging in an industrial process control and automation system according to this disclosure. The device 200 could, for example, represent the event database 143, event server 144, or end-user device 150 in the system 100 of FIG. 1. However, the event database 143, event server 144, or end-user device 150 could be implemented using any other suitable device or system, and the device 200 could be used in any other suitable system.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface that facilitates communications over at least one Ethernet, HART, FOUNDATION FIELDBUS, or other network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

When implementing the event database 143, the device 200 could execute instructions used to perform any of the functions associated with the event database 143. For example, the device 200 could execute instructions that detect events associated with an industrial control and automation system and that store event records in at least one data storage device. The device 200 could also execute instructions that retrieve event records and provide event records to one or more specified destinations.

When implementing the event server 144, the device 200 could execute instructions used to perform any of the functions associated with the event server 144. For example, the device 200 could execute instructions that generate and transmit notifications to end-user devices. The device 200 could also execute instructions supporting event paging and instructions that implement an algorithm that uses a "page-state" string as described below.

When implementing the end-user device 150, the device 200 could execute instructions used to perform any of the functions associated with the end-user device 150. For example, the device 200 could execute instructions that request event notifications and present information to users. The device 200 could also execute instructions supporting event paging and instructions that use a "page-state" string as described below.

Although FIG. 2 illustrates one example of a device 200 supporting smart event paging in an industrial process control and automation system, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
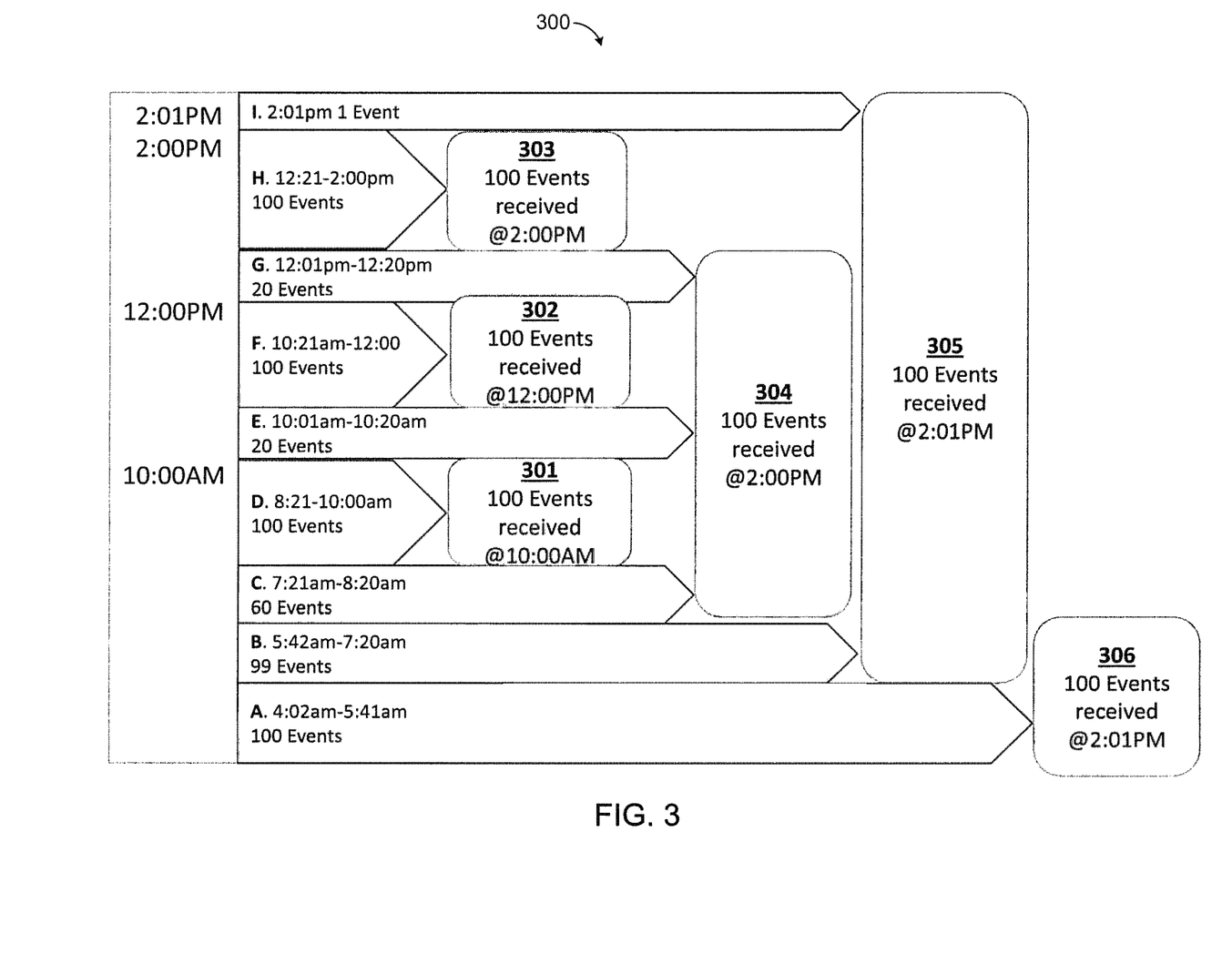
FIG. 3 illustrates an example timeline of events in a scenario for which smart event paging can be advantageously used to provide the events to a requesting client device according to this disclosure.

FIG. 3 illustrates an example timeline 300 of events in a scenario for which smart event paging can be advantageously used to provide the events to a requesting client device according to this disclosure. The timeline 300 is merely one example to illustrate the types of service interruptions, unprocessed time segments, and partially-processed time segments that may be encountered in a system that uses smart event paging. Other systems may experience different event scenarios.

In the timeline 300, an operator is monitoring one or more processes in an industrial process control and automation system, such as the system 100. Events associated with the processes are generated with some frequency. One example requirement of a system may be that the operator should see the most recent event information first and then see older events when there is time to receive them. This requirement may be due to the need to see critical alarms as soon as possible after they are generated.

The operator may be located in an area with poor wireless reception, such as within a plant 101a-101n. The operator has a mobile device (such as a mobile phone) executing a mobile paging application with smart event paging. The mobile device may represent one of the end-user devices 150. The mobile device requests and receives events from an event server, which is executing an event notification algorithm and accessing an event database. The event server may represent the event server 144, and the event database may represent the event database 143.

For ease of explanation, it is assumed that the operations in the system generate exactly one event per minute, the event paging size is set to one hundred events per page, and the event history age limit is set to twenty-four hours. Those skilled in the art will understand that these values are merely examples only. In general, the event paging size and event history limit can be selected based on, for example, performance requirements and capabilities of the system and devices. For example, an infinite paging size might allow thousands of events to return at once, causing throughput congestion. Other systems could include other event paging sizes, event history age limits, and operations that generate events more or less frequently and with less regularity.

Throughout the day, events are generated in the system at the rate of one event per minute. For example, as indicated in FIG. 3, one hundred events are generated during time segment A (4:02 am-5:41 am), and ninety-nine events are generated during time segment B (5:42 am-7:20 am). Other events are generated during time periods C through I, as indicated in the timeline.

On arriving at the facility at 10:00 am, the operator refreshes the display of the mobile device, causing the mobile paging application to initiate a request for events of the last twenty-four hours. As indicated at block 301, the mobile device communicates with the event server and receives the one hundred most recent events. The one hundred received events correspond to the events of time period D, because the one hundred events of time period D are the most recent as of 10:00 am. Due to poor reception, the mobile device then immediately loses its connection with the event server.

Because the mobile device has initiated a request for all events of the last twenty-four hours, the event notification algorithm keeps track of the twenty-four hour period for which the mobile device started the event paging session. The event server is able to continue event paging for this period, although it cannot continue doing so until the mobile device re-establishes its connection with the event server.

Two hours later at 12:00 pm, the mobile device suddenly reconnects with the event server. While the mobile device and the event server had no connection, another one hundred twenty events occurred in the system (time periods E and F). At block 302, the mobile device communicates with the event server, which returns the one hundred most recent events as of 12:00 pm, and these received events correspond to the events of time period F. Because of the system requirement to provide the most recent events, the event server does not return the twenty events from time period E (10:01-10:20) at this time. The mobile device then losses connection again with the event server.

At this point, the event notification algorithm keeps track of two partially processed time fragments: (i) the original twenty-four hour period ending at 10:00 am for which it has already returned one hundred events and (ii) the two hour period from 10:00 am to 12:00 pm for which it has also returned one hundred events.

Two hours later at 2:00 pm, the mobile device reconnects with the event server and maintains good reception for the rest of the day. At this point (2:00 pm), the event notification algorithm starts a new time fragment to account for the events that have occurred in the system from 12:00 pm to 2:00 pm (time periods G and H). At block 303, the event server returns the one hundred most recent of those events (the events corresponding to time period H). The event notification algorithm is also still tracking the partially processed period from 10:00 am to 12:00 pm and the partially processed period ending at 10:00 am. Because the system's event history age limit is set to 24 hours, the earlier period (ending at 10:00 am) is shrinking and at this point (2:00 pm) extends from 2:00 pm of the previous day to 10:00 am of the current day.

Because the mobile device and the event server are still connected, once the mobile device receives the events of time period H in block 303, the mobile device can request the next page of events, such as immediately or in response to user input. The event notification algorithm at the event server then determines that no new events have occurred in the brief period since its previous response (which could be a few seconds or less, depending on connection and processing latency). At block 304, the event server then returns the twenty remaining unsent events from 12:00 pm to 2:00 pm (those corresponding to time period G), the twenty remaining unsent events from 10:00 am to 12:00 pm (those corresponding to time period E), and sixty unsent events from the period ending at 10:00 am (those corresponding to time period C).

On receiving these events, the mobile device can immediately request the next page of events, such as immediately or in response to user input. At this point, the event server has returned all events generated between 7:21 am and 2:00 pm, and the event notification algorithm is only tracking the partially processed period prior to 10:00 am. In response to this latest request, the event notification algorithm first checks for any new events. Assume that it is now 2:01 pm and the event notification algorithm finds that there is one new event. At block 305, the event server returns the one new event (time period I) and the ninety-nine most recent unsent events from the period ending at 10:00 am (time period B).

This paging sequence can continue with the event server first returning any new events that may have arrived, along with unsent events from the period ending at 10:00 am in pages not exceeding one hundred events. For example, at block 306, the event server returns the one hundred most recent unsent events from the period ending at 10:00 am (time period A). Event transmission continues in one hundred event pages until all events in the twenty-four hour history period are returned with a final page that typically contains fewer than one hundred events.

In order for the mobile device to know whether or not more events are available (and thus whether to request more events from the event server), an indicator flag (which could be referred to as MoreData) is included in each event return message from the event server to the mobile device. During the event returns up to this point in FIG. 3 (the events in blocks 301-306 and any subsequent pages before the final page), the event server returns the MoreData flag set to true, indicating that there is more event data immediately available to return. When the final page of events is returned and no more events are immediately available, the event server returns the MoreData flag set to false, indicating that no more event data is immediately available.

On receiving the final event list with the MoreData flag set as false, the mobile device can enter an "event sleep" period in which the mobile device stops communicating with the event server. In some embodiments, the event sleep period can be a user-configurable period and can be set to any suitable value, such as 10 seconds (of course, shorter or longer periods are possible). At the end of each event sleep period, the mobile device can communicate with the event server to request any new events that may have occurred.

As shown in the timeline 300, when interruptions in coverage prevent reception, this can cause fragmenting of event reception, which can create challenges to keep track of sent events and unsent events while fulfilling the requirement of seeing the most recent events first. As a further complication, many systems require stateless operation at the event server. That is, the event server does not store state information regarding partially completed time segments of an event request from a client. Instead, the event server merely maintains the list of events in the event database. The event database also does not store state information of an event request from a client.

To address these issues, a page-state string can be used in event communications between the event server and the requesting client device. The page-state string can represent a single data structure that is passed back and forth between the event server and the client. In some embodiments, the page-state string can be formatted as a serialized JavaScript Object Notation (JSON) object. In other embodiments, XML, or any other suitable object to string serialization technique could be used for the page-state string. In particular embodiments, the page-state string is referred to as NextSmartPage, although the page-state string could be referred to by other names.

When the client initiates an event request session, the event server fulfills the request up to the limit of the predefined event paging size. The event server populates the page-state string with the current status of the event request session and returns the page-state string with the list of events to the client. The page-state string is temporarily loaded in the memory of the client, but the client may not actually process or query the information in the page-state string. Instead, the client could hold the page-state string so that it does not need to be stored at the event server. When the client later initiates its next event request, it passes the page-state string back to the event server. For the next event request, the event server fulfills the request based on the state information contained in the page-state string. To the client, the page-state string is a simple, opaque string that the client simply receives and returns. To the server, the page-state string is a set of instructions describing the state of the event request session. Here, the "state" may include details about the time fragments for which events have been successfully returned. For example, the page-state string can include of list of one or more Start Times (i.e., the starting time of a time fragment for which events have been returned) and End Times (i.e., the ending time of a time fragment for which events have been returned). In some situations the page-state string can include an one or more Event ID lists (i.e., event IDs at the end of the time fragment that might be returned in the next query due to event clumping), as described in greater detail below.

The use of a page-state string can provide one, some, or all of the following benefits depending on the implementation. The event server can be stopped and restarted with no required memory retention except for its access to the event database. Each client event request can be tracked and satisfied based on the content of the request (including the page-state string) and need not be based on any persistent knowledge of the client's paging state at the event server. Also, in larger deployments having multiple event servers acting in parallel, event requests from a client device may go at random to any of the event servers without loss of performance or functionality. In addition, a client may choose to abandon a paging session at any time without consideration for session memory at the event server (because there may be no requirement for session memory at the event server).

Each event typically has an event time that is used to fundamentally order the events and is the basis for prioritizing their return to the mobile device. In some embodiments, the relevant event time is the time at which the last activity associated with the event occurred. Initially, this could be the time that an event was generated (such as when a sensor determines a boiler temperature exceeds a threshold at 10:14, and the event activity time is 10:14). When further activity associated with event occurs (such as users making comments or taking ownership of the event), the event time is updated. For instance, if an operator inputs a status comment about the boiler temperature at 10:28, the new event time is 10:28.

Because the relevant time on the event can change, the event can actually move forward within an event schedule. Thus, an event returned during an earlier time segment (such as in a time segment that includes the 10:14 boiler event activity) may be returned again with a different event time for a later time segment (such as in a time segment that includes the 10:28 boiler event activity). Also, an event that has not yet been processed may "disappear" from one time segment and re-appear in a newer time segment. Thus, an indication of "new events arriving" can include brand new events appearing in the event list as well as existing events re-appearing from earlier in the list because their times have been updated.

Multiple events occur at substantially the same time and not all of these events can be returned in one return message due to page size limitations (such as with two hundred events that occur during the same one-second period and a one hundred event page size). To ensure that the same one hundred events do not get selected during each query, the page-state string can include a list of the event identifiers that were previously returned with a timestamp so that those events can be excluded in the next page request.

The event notification algorithm can also depend on reliable time sequences. The timestamp used to implement paging could be based on the time that an event was inserted into a list or the time that a last activity associated with the event occurred based on the event server's clock. In some embodiments, times are not based on external systems providing the events or a client device's notion of the time an activity occurred.

If times are not strictly sequenced from a single source, a mechanism can be used to handle out-of-sequence times. For example, when processing event queries close to a current time, the event server can be configured to track all of the events processed over a "time-shift period." When new events appear, they can be recognized as new. In such a configuration, when the event server collects current events, the event server records all of the events processed in the time shift period within the page-state string and includes the time shift period again in its next current values query. Based on this, the event server can exclude the events already processed when performing the next current values query. In some embodiments, the time shift period can be configurable. In general, the greater the allowed time-shift period, the greater the performance impact can be to the system.

Although FIG. 3 illustrates one example of a timeline 300 of events in a scenario for which smart event paging can be advantageously used to provide the events to a requesting client device, various changes may be made to FIG. 3. For example, the specific timeline shown here is an example only and is merely meant to help illustrate how an event notification algorithm can operate. The event notification algorithm could be configured to operate in any other suitable manner, and the event notification algorithm could operate with any other timeline of events.

Figure 4:
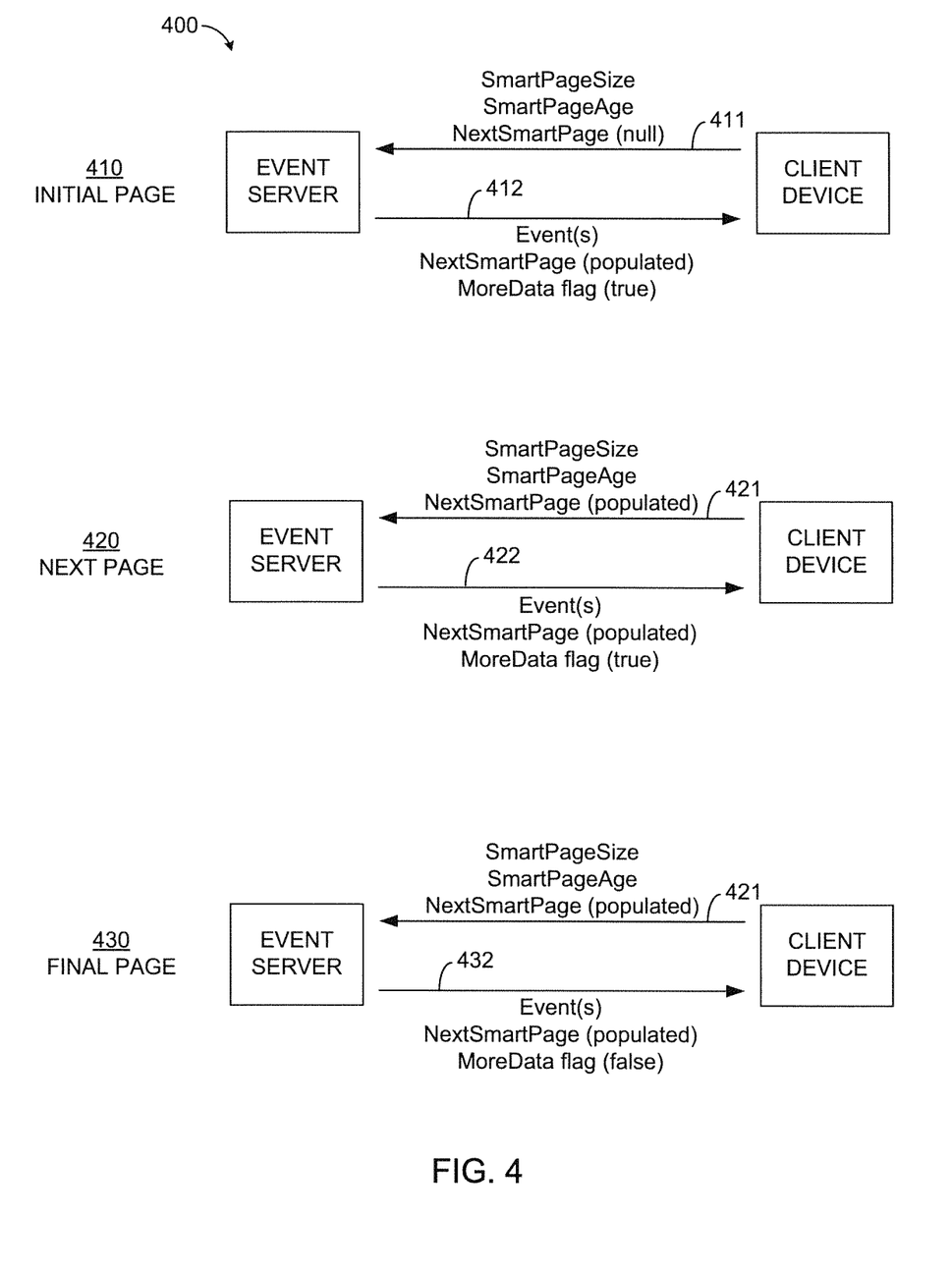
FIG. 4 illustrates example message flows between a client device and an event server using smart event paging according to this disclosure.

FIG. 4 illustrates example message flows between a client device and an event server using smart event paging according to this disclosure. The client device may represent one of the end-user devices 150, and the event server may represent the event server 144. The message flows illustrated in FIG. 4 reflect one session 400 for receiving an event history that includes multiple pages. The session 400 may represent all or part of a session used in the timeline 300 of FIG. 3. As shown in FIG. 4, the session 400 includes an initial event page 410, one or more next event pages 420, and a final event page 430.

The client device initiates the session 400 by sending an initial request message 411 to the event server. The initial request message 411 can include SmartPageSize, SmartPageAge, and NextSmartPage values. The SmartPageSize value denotes the event paging size limit, which is set to one hundred in the timeline 300. The SmartPageAge value denotes the event history age limit, which is set to twenty-four hours in the timeline 300. The NextSmartPage value denotes the page-state string. Because the initial request message 411 is a first request, there are no partially processed event segments to keep track of yet, and NextSmartPage can be set to null in the initial request message 411. In other embodiments, instead of a null NextSmartPage, the initial request message 411 may simply not include the NextSmartPage value.

The event server can recognize that the initial request message 411 is an initial request, such as by a null NextSmartPage or the absence of NextSmartPage. The event server retrieves the most recent events up to SmartPageSize and as far back as SmartPageAge. The event server then populates NextSmartPage and the MoreData flag based on whether or not there are unprocessed events that have not yet been returned for the session 400. The information populated in NextSmartPage could include event status information that can be used by the event server (or a parallel event server) in a subsequent event page (such as in the next event page 420). The event server returns the retrieved events, the populated NextSmartPage, and the MoreData flag to the client device in a response message 412.

If the MoreData flag is set to true, the client device knows that there is more event data to receive. The client device requests the next event page 420 in the session 400 by sending a next request message 421 to the event server. The next request message 421 includes SmartPageSize, SmartPageAge, and NextSmartPage. This time, NextSmartPage is the populated NextSmartPage received by the client device in the response message 412.

The event server receives the next request message 421 and again retrieves events, this time taking into consideration any unprocessed or partially processed blocks of events based on the information in NextSmartPage. The event server then repopulates NextSmartPage and sets the MoreData flag to true or false. The event server returns the newly retrieved events, the repopulated NextSmartPage, and the MoreData flag to the client device in a response message 422.

The client device can continue to send request messages 421 and receive response messages 422 as long as there are events remaining for the session. This is typically a tight loop where events are queried at the event server and sent to the client device and the next request is then immediately submitted. Eventually, a request message 421 will be received by the event server for a final event page 430. The event server retrieves the remaining events and sets the MoreData flag to false. The event server returns the remaining events, the repopulated NextSmartPage, and the MoreData flag to the client device in a final response message 432.

At this point, the client device can perform a sleep of some user configurable time. At the end of the sleep, the client device can repeat the initial event page 410 or the next event page 420. The process can continue with next event pages 420 with no delays until the MoreData flag again transitions to false.

Although FIG. 4 illustrates one example of message flows between a client device and an event server using smart event paging, various changes may be made to FIG. 4. For example, any other suitable messages having any suitable format could be used as part of the smart event paging.

Figure 5:
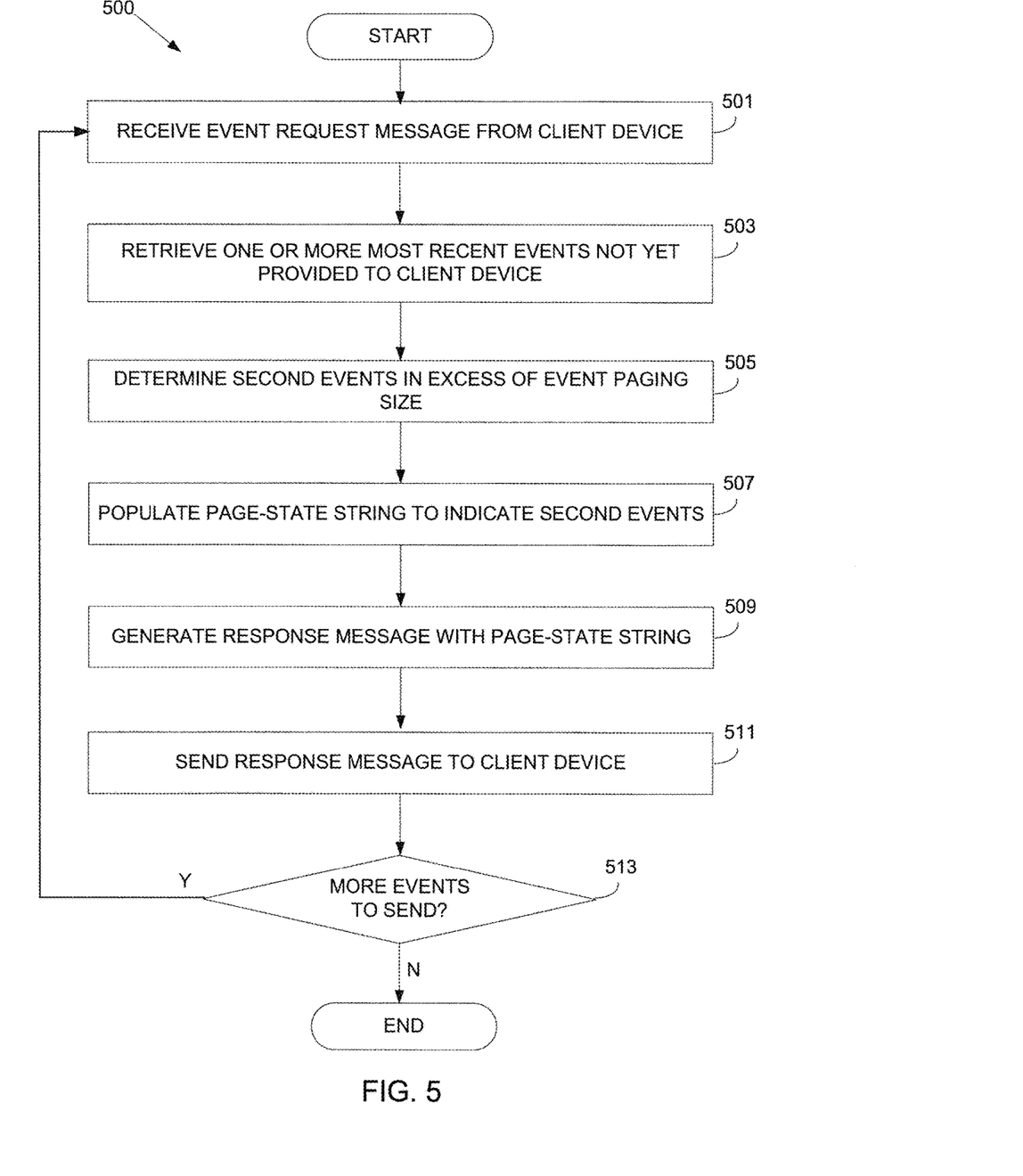
FIG. 5 illustrates an example method for smart event paging according to this disclosure.

FIG. 5 illustrates an example method 500 for smart event paging according to this disclosure. For ease of explanation, the method 500 is described as being performed using an event server, such as the event server 144 of FIG. 1. Also, the method 500 may include or represent various aspects of the timeline 300 of FIG. 3 and the session 400 of FIG. 4. However, the method 500 could be used with any suitable device or system.

At step 501, the event server receives an event request message from a client device. This may include, for example, the event server 144 receiving an initial request message 411 or a next request message 421 from an end-user device 150. The event request message can include an event paging size and an event history age limit. The event request message may also include a NextSmartPage string.

At step 503, the event server retrieves one or more events that have most recently occurred since a previous event request and that have not already been provided to the client device, up to the event paging size and the event history age limit. This may include, for example, the event server 144 retrieving events similar to the scenario described in blocks 301-306.

At step 505, the event server determines that one or more second events are within the event history age limit and have not already been provided to the client device but are in excess of the event paging size. This may be analogous to the event server determining that events in time periods A-C in FIG. 3 exceed the event paging size for the events sent in block 301.

At step 507, the event server populates a page-state string to indicate the second events. Later, at step 509, the event server generates a response message including the retrieved events, the page-state string, and a MoreData flag. At step 511, the event server sends the response message to the client device. This may include, for example, the event server sending a response message 412, 422, 432 to the client device.

At step 513, it is determined if more events are available to be sent. This may include, for example, the client device reading the MoreData flag in the response message. If it is determined that more events are available to be sent, the method returns to step 501.

Although FIG. 5 illustrates one example of a method 500 for smart event paging, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs. Also, while the method 500 and the event server are described with respect to events in an industrial process control system, the method 500 and event server may be used in conjunction with other types of devices and systems.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving a first event request message from a client device;
initiating an event request session responsive to the event request message;
retrieving one or more first events that have most recently occurred since a previous event request and that have not already been provided to the client device, up to a first event paging size and a first event history age limit;
determining that one or more second events are within the first event history age limit and have not already been provided to the client device but are in excess of the first event paging size, wherein the one or more second events comprise a plurality of second events having event times distributed across at least (i) a first time segment that is before the one or more first events and (ii) a second time segment that is after the one or more first events, the first time segment and the second time segment being non-contiguous;
populating a page-state string with a current status of the event request session an indication of the one or more second events and a list of identifiers identifying events that were previously returned to the client device, wherein the page-state string is populated to indicate both the first time segment and the second time segment;
generating a first response message including the one or more first events and the page-state string; and
sending the first response message to the client device.

2. The method of claim 1, further comprising:
receiving a second event request message from the client device, the second event request message comprising the page-state string;
retrieving at least one of the one or more second events based on the page-state string;
determining that one or more third events are within a second event history age limit and have not already been provided to the client device but are in excess of a second event paging size;
repopulating the page-state string to indicate the one or more third events;
generating a second response message including the at least one second event and the page-state string; and
sending the second response message to the client device.

3. The method of claim 2, wherein:
the first event request message comprises the first event paging size and the first event history age limit; and
the second event request message further comprises the second event paging size and the second event history age limit.

4. The method of claim 2, wherein:
the response message includes a data indicator configured to indicate the presence or absence of further events to send to the client device; and
the second event request message is sent from the client device only when the data indicator is set to indicate the presence of further events to send to the client device.

5. The method of claim 1, wherein the events are associated with one or more processes in an industrial process and control system.

6. The method of claim 1, wherein the page-state string comprises a JavaScript Object Notation (JSON) object.

7. The method of claim 1, wherein the client device is a mobile device configured to wirelessly communicate with a second device performing the method.

8. An apparatus comprising:
at least one interface configured to communicate with a client device; and
at least one processing device configured to:
receive a first event request message from the client device;
initiating an event request session responsive to the event request message;
retrieve one or more first events that have most recently occurred since a previous event request and that have not already been provided to the client device, up to a first event paging size and a first event history age limit;
determine that one or more second events are within the first event history age limit and have not already been provided to the client device but are in excess of the first event paging size;
populating a page-state string with the current status of the event request session and returning the page-state string with a list of events to the client to indicate the one or more second events wherein the page-state string includes a list of identifiers that were previously returned with a timestamp;
generate a first response message including the one or more first events and the page-state string; and
send the first response message to the client device.

9. The apparatus of claim 8, wherein the at least one processing device is further configured to:
receive a second event request message from the client device, the second event request message comprising the page-state string;
retrieve at least one of the one or more second events based on the page-state string;
determine that one or more third events are within a second event history age limit and have not already been provided to the client device but are in excess of a second event paging size;
repopulate the page-state string to indicate the one or more third events;
generate a second response message including the at least one second event and the page-state string; and
send the second response message to the client device.

10. The apparatus of claim 9, wherein:
the first event request message comprises the first event paging size and the first event history age limit; and
the second event request message further comprises the second event paging size and the second event history age limit.

11. The apparatus of claim 9, wherein:
the response message includes a data indicator configured to indicate the presence or absence of further events to send to the client device; and
the second event request message is sent from the client device only when the data indicator is set to indicate the presence of further events to send to the client device.

12. The apparatus of claim 8, wherein the events are associated with one or more processes in an industrial process and control system.

13. The apparatus of claim 8, wherein the page-state string comprises a JavaScript Object Notation (JSON) object.

14. A non-transitory computer readable medium containing instructions that, when executed by at least one processing device, cause the at least one processing device to:
receive a first event request message from a client device;
initiating an event request session responsive to the event request message;
retrieve one or more first events that have most recently occurred since a previous event request and that have not already been provided to the client device, up to a first event paging size and a first event history age limit;
determine that one or more second events are within the first event history age limit and have not already been provided to the client device but are in excess of the first event paging size;
populating a page-state string with the current status of the event request session and returning the page-state string with a list of events to the client to indicate the one or more second events wherein the page-state string includes a list of identifiers that were previously returned with a timestamp;
generate a first response message including the one or more first events and the page-state string; and
send the first response message to the client device.

15. The non-transitory computer readable medium of claim 14, further containing instructions that, when executed by the at least one processing device, cause the at least one processing device to:
receive a second event request message from the client device, the second event request message comprising the page-state string;
retrieve at least one of the one or more second events based on the page-state string;
determine that one or more third events are within a second event history age limit and have not already been provided to the client device but are in excess of a second event paging size;
repopulate the page-state string to indicate the one or more third events;
generate a second response message including the at least one second event and the page-state string; and
send the second response message to the client device.

16. The non-transitory computer readable medium of claim 15, wherein:
the first event request message comprises the first event paging size and the first event history age limit; and
the second event request message further comprises the second event paging size and the second event history age limit.

17. The non-transitory computer readable medium of claim 15, wherein:

the response message includes a data indicator configured to indicate the presence or absence of further events to send to the client device; and the second event request message is sent from the client device only when the data indicator is set to indicate the presence of further events to send to the client device.

* * * * *